United States Patent
Hidaka et al.

(10) Patent No.: US 9,388,994 B2
(45) Date of Patent: Jul. 12, 2016

(54) DEHUMIDIFICATION AND HUMIDIFICATION APPARATUS FOR VEHICLES

(75) Inventors: Hideto Hidaka, Yokohama (JP); Hiroyuki Kakiuchi, Yokohama (JP); Toshihiro Tsuemoto, Toyota (JP); Takanobu Nakaguro, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1803 days.

(21) Appl. No.: 12/445,415

(22) PCT Filed: Oct. 17, 2007

(86) PCT No.: PCT/JP2007/001129
§ 371 (c)(1),
(2), (4) Date: Aug. 7, 2009

(87) PCT Pub. No.: WO2008/047476
PCT Pub. Date: Apr. 24, 2008

(65) Prior Publication Data
US 2010/0022177 A1    Jan. 28, 2010

(30) Foreign Application Priority Data

Oct. 18, 2006   (JP) ................................ 2006-283515

(51) Int. Cl.
*B60H 3/00*   (2006.01)
*F24F 3/14*   (2006.01)
(Continued)

(52) U.S. Cl.
CPC .......... *F24F 3/1411* (2013.01); *B60H 1/00478* (2013.01); *B60H 3/02* (2013.01); *F24F 3/1429* (2013.01); *B60H 2003/028* (2013.01); *F24F 5/0042* (2013.01)

(58) Field of Classification Search
CPC ........ B60H 3/00; B60H 3/0007; B60H 3/071; B60H 1/00478; F24F 3/1411
USPC ....................... 454/156, 157, 158, 121; 62/3.2
See application file for complete search history.

(56) References Cited

U.S. PATENT DOCUMENTS

| 5,946,188 A * | 8/1999 | Rochel et al. ................. 361/690 |
| 6,213,198 B1 * | 4/2001 | Shikata et al. ................. 165/202 |

(Continued)

FOREIGN PATENT DOCUMENTS

| JP | 05-200237 | 8/1993 |
| JP | 11-123959 | 5/1999 |

(Continued)

OTHER PUBLICATIONS

Translation of JP2000-97038.*

(Continued)

*Primary Examiner* — Alissa Tompkins
*Assistant Examiner* — Brittany Towns
(74) *Attorney, Agent, or Firm* — Nixon & Vanderhye P.C.

(57) ABSTRACT

The present invention relates to a dehumidification and humidification apparatus for vehicles using an adsorbent which is capable of feeding a dehumidified air for preventing fogging of window glass and a humidified air for improvement in comfortableness, and is simplified in construction thereof and reduced in size thereof. The dehumidification and humidification apparatus for vehicles according to the present invention comprises a casing (1), and a blower (2), an adsorbent module (3) and an air passage switching device (4) which are accommodated in the casing. The adsorbent module (3) comprises a Peltier element (30), and a first adsorption component (31) and a second adsorption component (32) which are directly disposed on the respective surfaces of the Peltier element, and the air passage switching device (4) is arranged such that the air passing through the first adsorption component (31) and the air passing through the second adsorption component (32) are each turned toward either a first blowoff port (11) or a second blowoff port (12), and turning directions of the respective airs are switchable therebetween. An electric current flowing through the Peltier element (30) in the adsorbent module (3) is reversed to switch operations of the Peltier element between a heat-absorbing portion and a radiating portion, and switch the turning directions of the respective airs in the air passage switching device (4).

5 Claims, 7 Drawing Sheets

(51) Int. Cl.
 B60H 1/00 (2006.01)
 B60H 3/02 (2006.01)
 *F24F 5/00* (2006.01)

(56) References Cited

U.S. PATENT DOCUMENTS

| | | | |
|---|---|---|---|
| 6,805,623 B2 * | 10/2004 | Robison et al. | 454/143 |
| 6,829,900 B2 * | 12/2004 | Urch | 62/3.2 |
| 7,594,539 B2 * | 9/2009 | Isaka | F24F 12/006 165/248 |
| 2002/0134087 A1 * | 9/2002 | Urch | 62/3.2 |
| 2004/0121719 A1 * | 6/2004 | Robison et al. | 454/143 |

FOREIGN PATENT DOCUMENTS

| | | |
|---|---|---|
| JP | 2000074415 A * | 3/2000 |
| JP | 2000-142096 | 5/2000 |
| JP | 2000-146220 | 5/2000 |
| JP | 2001-97038 | 4/2001 |
| JP | 2001-221470 | 8/2001 |
| JP | 2002-228189 | 8/2002 |
| JP | 2003-1047 | 1/2003 |
| JP | A-2003-001047 | 1/2003 |
| JP | 2003-227627 | 8/2003 |
| JP | A-2003-227627 | 8/2003 |
| JP | 2003252041 A * | 9/2003 |
| JP | 2003-314856 | 11/2003 |
| JP | 2003314856 A * | 11/2003 |
| JP | 2005-230716 | 9/2005 |
| JP | 2006-010307 | 1/2006 |
| JP | 2006-232232 | 9/2006 |
| JP | 2007-187403 | 7/2007 |

OTHER PUBLICATIONS

Translation of JP2000-146220.*
International Search Report for PCT/JP2007/001129, mailed Jan. 22, 2008.
Supplementary European Search Report for European Application No. 07827908 mailed May 7, 2013.

* cited by examiner

A-A CROSS SECTION

B-B CROSS SECTION

B-B CROSS SECTION

COMPARISON BETWEEN ADSORPTION CHARACTERISTICS

DEHUMIDIFICATION AND HUMIDIFICATION APPARATUS FOR VEHICLES

This application is the U.S. national phase of International Application No. PCT/JP2007/001129, filed 17 Oct. 2007, which designated the U.S. and claims priority to Japanese Patent Application No. 2006-283515, filed 18 Oct. 2006 the entire contents of each of which are hereby incorporated by reference.

TECHNICAL FIELD

The present invention relates to a dehumidification and humidification apparatus for vehicles, and more particularly, to a dehumidification and humidification apparatus for vehicles utilizing adsorption and desorption functions of an adsorbent which is capable of feeding dehumidified air to window glass for preventing fogging thereof and feeding humidified air to passenger side, for example, in the winter season.

BACKGROUND ART

As one of air conditioning techniques for a compartment of vehicles, various dehumidification and humidification techniques utilizing water vapor-adsorbing and desorbing functions of an adsorbent have been studied in order to make the compartment of vehicles more comfortable and contemplate saving of energy. As to such techniques, there has been proposed the "air conditioning method for a compartment of vehicles" in which when dry air outside of the compartment is introduced and blown off toward window glass for preventing fogging of the window glass while circulating air inside of the compartment, for example, in the winter season, water being present in a part of the air which is discharged from an inside of the compartment to outside is captured with an adsorbent such as activated carbon and zeolite, and the thus captured water is returned to the compartment to prevent drying of the compartment.

In the above air conditioning method, while rotating a so-called adsorption rotor having an air-permeable cylindrical honeycomb structure on which an adsorbent is supported, at a constant speed, water is adsorbed in the adsorbent when a part of the adsorption rotor passes through a predetermined adsorption region (air passage for discharging air in the compartment to outside), and the adsorbent is heated by air heated by an electric heater when the part of the adsorption rotor passes through a predetermined desorption region (air passage for circulating the air in the compartment), thereby allowing the water adsorbed in the adsorbent to be desorbed therefrom.

Patent Document 1: Japanese Patent Application Laid-Open (KOKAI) No. 2000-142096

In addition, as the dehumidifying and humidifying techniques, in order to contemplate saving of energy for a cooling air conditioner (cooler) and feed dehumidified comfortable air to passenger side, there has been proposed the "air conditioner" in which an air passage is divided into two air ducts each provided at opposite ends thereof with an air intake port and an air discharge port, by a partition, and a heat exchanger and a moisture-adsorbing member (adsorption rotor) are successively disposed so as to span between the two air ducts.

In the above air conditioner, the air passing through one of the air ducts is cooled by the heat exchanger, whereas the air passing through the other of the air ducts is heated by the heat exchanger. The moisture-adsorbing member is rotated or pivoted between the two air ducts to repeat adsorption and desorption operations. The air dehumidified by passing through the one of the air ducts is fed to the compartment, whereas the air humidified by passing through the other of the air ducts is discharged outside of the compartment. The heat exchanger comprises a Peltier element having a heat-absorbing portion and a radiating portion which are each provided with a heat transfer portion. The air passing through the one of the air ducts is cooled by the heat transfer portion on the side of the heat-absorbing portion of the Peltier element, and the air passing through the other of the air ducts is heated by the heat transfer portion on the side of the radiating portion of the Peltier element to thereby supply to the moisture-absorbing member, cold heat required for promoting the adsorption operation and warm heat required for promoting the desorption operation.

Patent Document 2: Japanese Patent Application Laid-Open (KOKAI) No. 2000-146220

DISCLOSURE OF THE INVENTION

Problem to be Solved by the Invention

However, in the dehumidification and humidification apparatus for vehicles as constructed according to the above conventional dehumidifying and humidifying techniques using the adsorbent, it is required to support the absorbent on a rotating member such as an adsorption rotor and install a drive mechanism for driving the rotating member in a specific region such as air ducts which forms an adsorption region and a desorption region. Therefore, there tends to arise such a problem that the apparatus is hardly simplified in its structure. Further, the apparatus also requires a casing having a sufficient capacity for accommodating the rotating member and the drive mechanism therefor, resulting in such a problem that downsizing of the apparatus is difficult.

When using the Peltier element as described above, the adsorbent can be simultaneously subjected to heating and cooling and, therefore, can be enhanced in adsorption efficiency as compared to the conventional methods in which heating and desorption of the adsorbent is carried out by using an electric heater. However, even when using the Peltier element, it is required to heat and cool air in the air ducts through the heat transfer portions formed on both sides of the Peltier element, and heat and cool the adsorbent through the air itself passing through the adsorption rotor. For this reason, there also tends to arise such a problem that the apparatus has a low heat efficiency, and the size of the Peltier element itself must be increased in comparison with an amount of heat generated therefrom.

Further, in the method using the adsorption rotor, the adsorbent supported thereon is cooled by the air to be dehumidified, so that the temperature of the air itself is raised during passing through the adsorption rotor by heat radiation owing to the adsorption. Thus, the adsorbent tends to fail to exhibit a sufficient adsorption function as a whole. On the other hand, the adsorbent supported on the adsorption rotor is heated by the air to be humidified, so that the temperature of the air itself is decreased during passing through the adsorption rotor by heat absorption owing to the desorption. Thus, the adsorbent tends to similarly fail to exhibit a sufficient desorption function as a whole. As a result, it is required to increase the air-passing area and support a more than necessary large amount of the adsorbent on the adsorption rotor, resulting in such a tendency that the adsorption rotor is increased in size.

The present invention has been made in view of the above conventional problems. An object of the present invention is to provide a dehumidification and humidification apparatus for vehicles utilizing adsorption and desorption functions of an adsorbent which is capable of feeding dehumidified air to window glass for preventing fogging thereof and feeding humidified air to passenger side, for example, in the winter season, and which can be simplified in construction and reduced in size.

Means for Solving the Problem

To solve the above problems, according to the present invention, a pair of adsorbent components of a fixed type on which an absorbent is supported, are respectively directly disposed on a pair of plate surfaces of a Peltier element which function as a heat-absorbing portion and a radiating portion, respectively, thereby constituting an adsorbent module. The Peltier element is adapted, for example, to directly cool the first adsorption component for promoting adsorption of a substance to be adsorbed, i.e., an adsorbate, on the absorbent and simultaneously, for example, to directly heat the second adsorption component for promoting desorption of the adsorbate from the absorbent. The air dehumidified by passing through the first adsorption component is blown off through a first blowoff port, whereas the air humidified by passing through the second adsorption component is blown off through a second blowoff port. In the adsorbent module, an electric current flowing through the Peltier element is reversed to conduct switching between the heat-absorbing portion and the radiating portion so that cooling and heating of the respective adsorption components are changed over, thereby reversing the operations of the respective adsorption components from adsorption operation to desorption operation and vice versa. Further, using an air passage switching device, turning directions of the air passing through the first adsorption component and the air passing through the second adsorption component are switched according to the reversal between the adsorption operation and the desorption operation of the respective adsorption components. With such an arrangement, for example in the winter season, the dehumidified air is continuously blown off through the first blowoff port to prevent fogging of window glass, and the humidified air is continuously blown off through the second blowoff port to improve comfortableness of passengers in vehicles.

Namely, in an aspect of the present invention, there is provided a dehumidification and humidification apparatus for vehicles for dehumidifying and humidifying air in a compartment of the vehicles, comprising a casing defining an air passage, and a blower, an adsorbent module and an air passage switching device which are successively accommodated in the casing in this order along a flow direction of the air, wherein the casing comprises a first blowoff port through which the dehumidified (or humidified) air is blown off and a second blowoff port through which the humidified (or dehumidified) air is blown off; the adsorbent module comprises a Peltier element having a pair of plate surfaces which function as a heat-absorbing portion and a radiating portion, respectively, and a first adsorption component and a second adsorption component which each comprise an air-permeable element and an adsorbent supported thereon and are directly disposed on the respective plate surfaces of the Peltier element, the adsorbent module being disposed in the casing such that the air fed from the blower is allowed to pass through the respective adsorption components; and the air passage switching device is capable of turning each of the air passing through the first adsorption component of the adsorbent module and the air passing through the second adsorption component of the adsorbent module toward either the first blowoff port or the second blowoff port of the casing such that turning directions of the respective airs are switchable, and wherein an electric current flowing through the Peltier element in the adsorbent module is reversed to conduct switching between the heat-absorbing portion and the radiating portion of the Peltier element, and the air passage switching device is operated to switch the turning directions of the respective airs passing through the first and second adsorption components according to reversal of the electric current.

Effect of the Invention

In the dehumidification and humidification apparatus for vehicles according to the present invention, the adsorbent module is constituted from a pair of the adsorption components of a fixed type and the Peltier element. When reversing an electric current flowing through the Peltier element, the respective adsorption components are switched from adsorption operation to desorption operation and vice versa, and turning directions of the dehumidified and humidified airs toward the respective blowoff ports are switched by means of the air passage switching device. Therefore, the dehumidification and humidification apparatus of the present invention requires no rotational drive portion unlike the conventional apparatuses of an adsorption rotor type. Further, since the respective adsorption components are directly disposed on the plate surfaces of the Peltier element which function as a heat-absorbing portion and a radiating portion, respectively, heat transfer between the Peltier element and the respective adsorption components upon heating and cooling the adsorption components is increased, thereby further reducing sizes of the adsorption components and the Peltier element. Thus, in accordance with the present invention, the apparatus can be further simplified in construction and reduced in size.

EXPLANATION OF REFERENCE NUMERALS

1: Casing; 10; Intake port; 11: First blowoff port; 12: Second blowoff port; 2: Blower; 3: Adsorbent module; 30: Peltier element; 3a: Plate surface of Peltier element (heat-absorbing portion or radiating portion); 3b: Plate surface of Peltier element (radiating portion or heat-absorbing portion); 31: First adsorption component; 32: Second adsorption component; 33: Element; 4: Air passage switching device; 41: First introduction chamber; 42: Second introduction chamber; 43: Distribution chamber; 44: Damper; 45: Actuator; 5: Heater/cooler; 51: Introduction port; 52: Introduction port; 61: First inlet port; 62: Second inlet port; 71: First outlet port; 72: Second outlet port; 8a: Space; 8b: Space; 9a: Space; 9b: Space

PREFERRED EMBODIMENT FOR CARRYING OUT THE INVENTION

One preferred embodiment of the dehumidification and humidification apparatus for vehicles according to the present invention is described by referring to the accompanying drawings. Meanwhile, in the following description of the preferred embodiment, the dehumidification and humidification apparatus for vehicles is referred to merely as a "dehumidification and humidification apparatus".

The dehumidification and humidification apparatus of the present invention is an apparatus for dehumidifying and humidifying air in a compartment of vehicles which is used for feeding dehumidified air to window glass to prevent fogging thereof and feeding humidified air to passenger side, for example, in the winter season in which outside air is kept dried. Alternatively, when changing the setting of operation of the below-mentioned air passage switching device, the dehumidified air may also be fed to the passenger side in the summer season in which outside air is kept highly wet. In addition, the dehumidification and humidification apparatus of the present invention may be incorporated in existing air conditioners, and further the dehumidification and humidification apparatus which is formed into a thin box shape as a whole may also be disposed in a ceiling portion of the compartment as described hereinlater.

Figure 1:
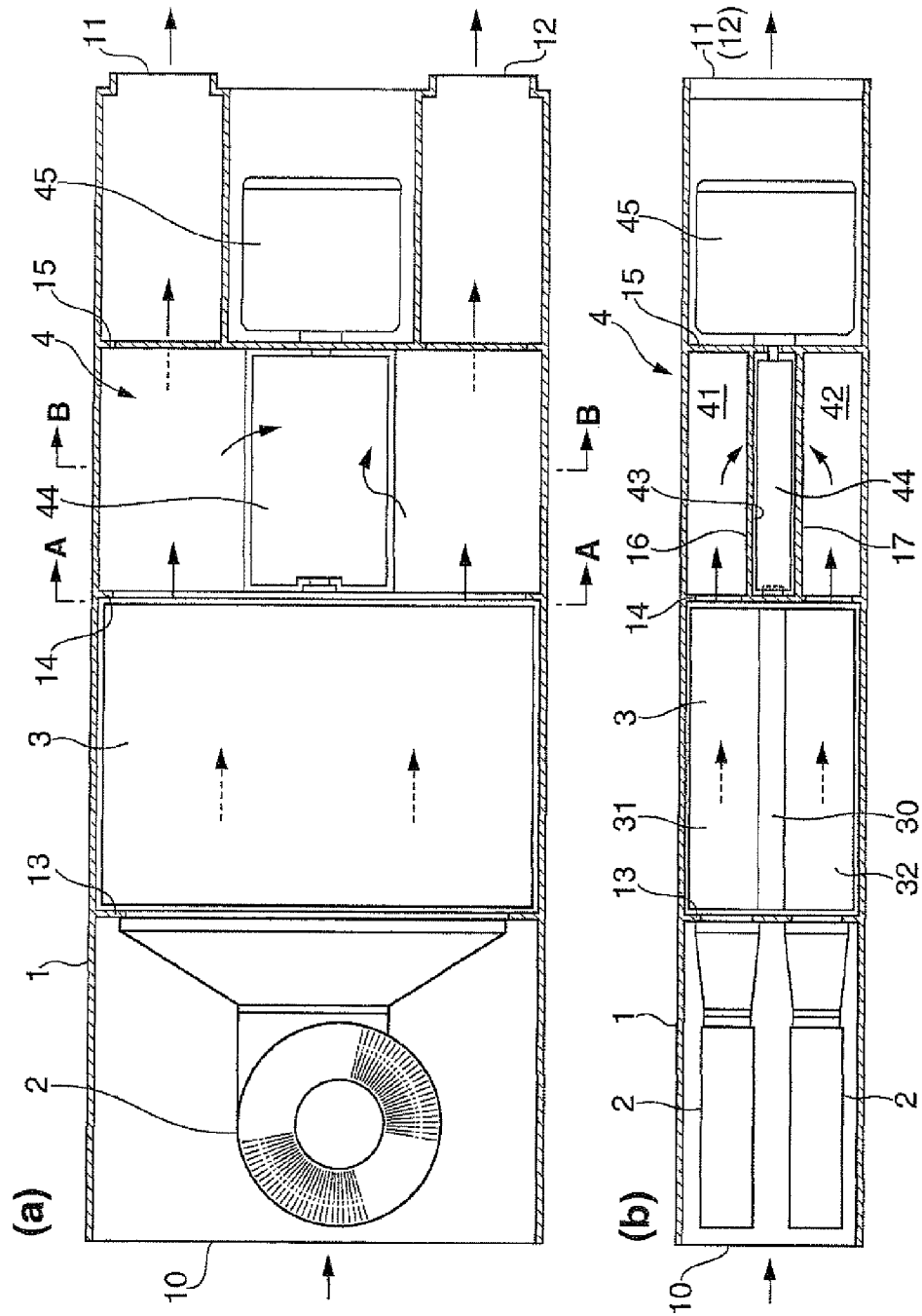
FIG. 1 are a plan view and a side view showing, partially broken away, an example of a structure of a dehumidification and humidification apparatus for vehicles according to the present invention.

The dehumidification and humidification apparatus of the present invention comprises a casing (1) defining an air passage, and a blower (2), an absorbent module (3) and an air passage switching device (4) which are accommodated within the casing (1) in this order along a flowing direction of the air as shown in FIG. 1. The casing (1) is designed into various shapes according to the position where the casing is disposed. In order to dispose the apparatus in the ceiling portion as described above, the casing (1) may be formed into a flat rectangular box shape in which its portion corresponding to a height thereof is designed to have a small thickness. Meanwhile, the casing (1) may be formed into a curved outer shape in thickness direction, length direction or width direction according to the shape of the ceiling portion.

The casing (1) is provided at a front end thereof with an intake port (10) for sucking air into the compartment, and at a rear end thereof with a first blowoff port (11) for blowing off dehumidified (or humidified) air and a second blowoff port (12) for blowing off humidified (or dehumidified) air. Meanwhile, these blowoff ports (11) and (12) may have a curved sectional shape in order to reduce pressure loss therethrough. In addition, ribs (13), (14) and (15) are fitted inside of the casing (1) in order to divide an interior of the casing into plural spaces in which the blower (2) and the adsorbent module (3) are accommodated and the air passage switching device is constructed, along a flowing direction of the air.

The blower (2) comprises two blower units corresponding to a pair of adsorption components (31) and (32) of the below-mentioned adsorbent module (3), respectively. As the blower (2), there may be usually used a centrifugal fan of a D.C. type. Such a centrifugal fan may have a rotating speed of about 3000 to 6000 rpm, a maximum hydrostatic pressure of about 100 to 300 Pa and a maximum air flow of about 0.1 to 0.5 $m^3$/min. The blower (2) is fixedly fitted to the rib (13) having upper and lower vent holes and disposed near the front end of the casing (1). Meanwhile, in the present invention, the blower (2) may be constituted from only one common blower unit which is capable of feeding air to a pair of the adsorption components (31) and (32).

In the present invention, no drive mechanism is required, and the adsorbent module (3) having a specific high heat efficiency is used. More specifically, as shown in FIG. 2, the adsorbent module (3) comprises a Peltier element (30) having a pair of plate surfaces which function as a heat-absorbing portion and a radiating portion, respectively, and the first adsorption component (31) and the second adsorption component (32) which each comprise an air-permeable element (33) supporting an adsorbent and are directly disposed on the respective plate surfaces (3a) and (3b) of the Peltier element (30).

Figure 2:
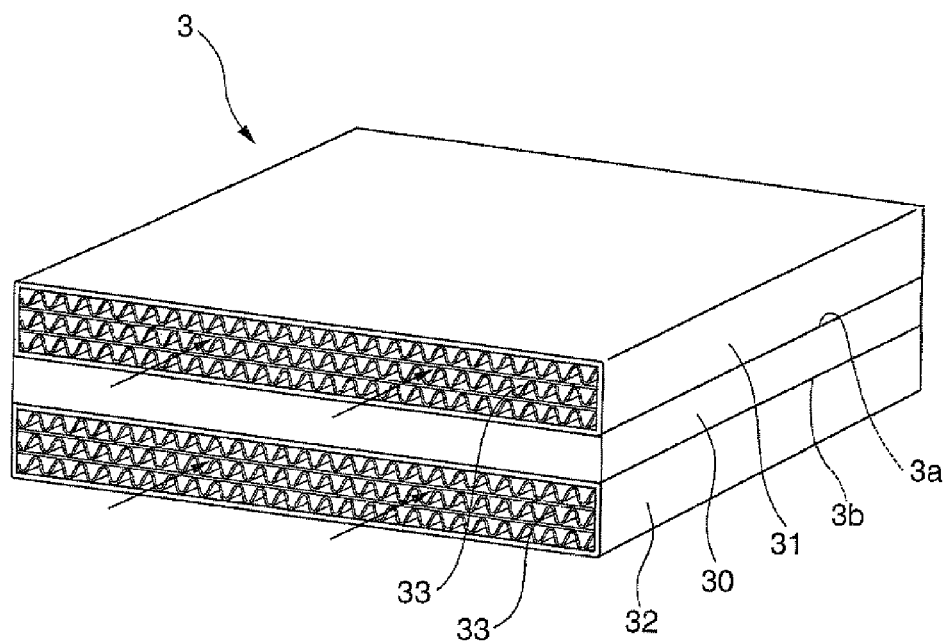
FIG. 2 is a perspective view showing an example of an absorbent module used in a dehumidification and humidification apparatus for vehicles according to the present invention.

The adsorbent module (3) may be formed into a flat rectangular shape as shown in FIG. 2. Alternatively, the adsorbent module (3) may also be formed into a curved shape depending upon a structure of the casing. Further, in the adsorbent module (3), the first adsorption component (31) and the second adsorption component (32) may be directly disposed on the respective plate surfaces (3a) and (3b) of the Peltier element (30) without interposing any air layer or other heat-insulating element therebetween or may be disposed thereon through a heat conductive material such as a silver paste and a grease, as long as heat transfer of warm heat and cold heat generated by the Peltier element (30) is ensured therebetween.

As shown in FIG. 1, the adsorbent module (3) is disposed in the casing (1) so as to allow the air fed by the blower (2) to pass through the respective adsorption components (31) and (32). More specifically, the adsorbent module (3) is disposed between the ribs (13) and (14) each having upper and lower vent holes (refer to FIG. 4) such that the airs passing through the vent holes of the rib (13) are introduced into the elements (33) of the adsorption components (31) and (32), respectively, and then the airs passing through the elements (33) are flowed through the respective vent holes of the rib (14).

In the adsorbent module (3), the Peltier element (30) is an element utilizing a Peltier effect as known in the art, and is an electronic part used as a cooling device for electronic equipments such as computers. More specifically, the Peltier element comprises a large number of P-type semiconductors and N-type semiconductors disposed between two kinds of metal plates in which one of the metal plates constitutes N-P junction and the other of the metal plates constitutes P-N junction. In such an element, when an electric current flows through the P-N junction, heat transfer is caused, so that heat-absorbing phenomenon occurs on one of the metal plates whereas radiating phenomenon occurs on the other of the metal plates.

In the present invention, in order to reduce the size of the adsorbent module (3), there is used the Peltier element (30) having, for example, a flat plate shape whose plate surfaces (3a) and (3b) function as a heat absorbing portion and a radiating portion, respectively. Such a Peltier element (30) has a power consumption of 1.4 to 120 W, a maximum heating temperature of 80 to 90° C. and a maximum temperature difference of 64 to 83° C. In the dehumidification and humidification apparatus of the present invention, upon designing of the Peltier element (30), the radiating capacity ($W_1$) and the heat-absorbing capacity ($W_2$) required for the Peltier element are calculated according to the following formulae.

Radiating capacity ($W_1$)=[(Specific enthalpy of humidified air [kJ/kg (DA)])−(Specific enthalpy of intake port air [kJ/kg (DA)])]×(Air density [kg (DA) m$^3$])×(Air flow of humidified air [m$^3$/h])

Heat-absorbing capacity ($W_2$)=[(Specific enthalpy of intake port air [kJ/kg (DA)])−(Specific enthalpy of dehumidified air [kJ/kg (DA)])−]×(Air density [kg (DA) m$^3$])×(Air flow of dehumidified air [m$^3$/h])

In the above formulae, the unit of kg (DA) represents one kilogram of dried air.

Figure 3:
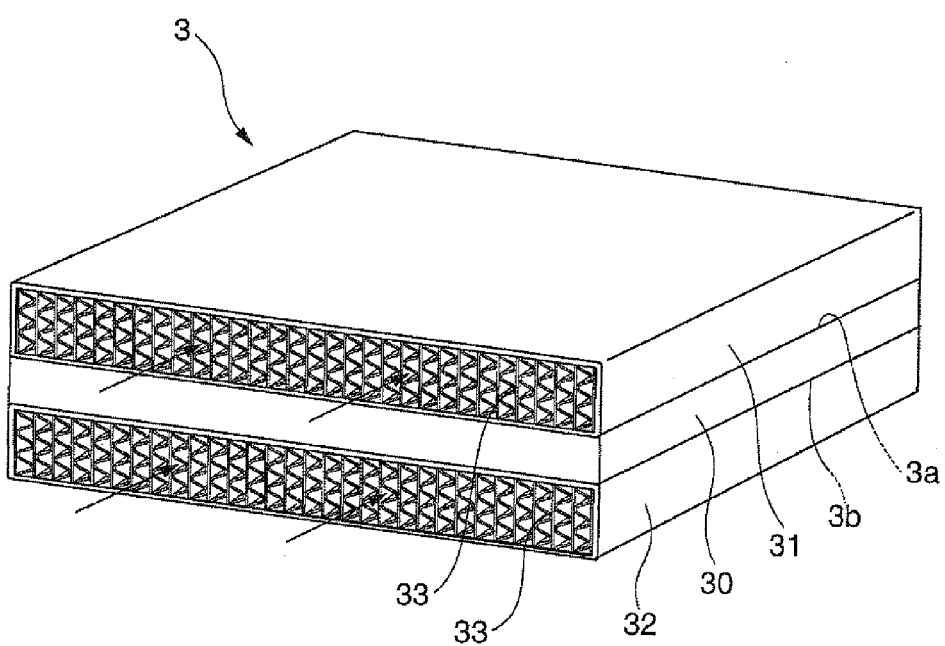
FIG. 3 is a perspective view showing another example of an absorbent module used in a dehumidification and humidification apparatus for vehicles according to the present invention.

The first adsorption component (31) and the second adsorption component (32) respectively comprise the air-permeable element (33) and the absorbent supported thereon as shown in FIGS. 2 and 3, and are each usually formed into a flat box-like outer shape in order to accommodate these components in the casing (1) of a thin type. The respective adsorption components (31) and (32) are constructed by accommodating the element (33) in a metal casing in order to conduct efficient heat transfer (of cold heat and warm heat) between the element (33) and the Peltier element (30).

The element (33) may have various structures as long as it is possible to reduce the size thereof, ensure a large adsorption area and retain a still larger amount of the powdery adsorbent thereon. The elements (33) may have, for example, a corrugated type structure as shown in the figures in which an opening of each air-passing cell is formed into a generally triangular shape by the corrugated base sheets, a honeycomb type structure in which an opening of each air-passing cell is formed into a generally hexagonal shape, or a grid type structure in which an opening of each air-passing cell is formed into a quadrangular shape.

For example, as shown in FIG. 2, the element (33) of a corrugated type structure have a large number of air-passing cells formed by alternately laminating the base sheet having a generally corrugated shape and the base sheet having a generally flat plate shape. More specifically, the element (33) of each of the adsorption components (31) and (32) have such a structure in which a plurality of honeycomb sheets each having a row of cells formed by overlapping the corrugated base sheet on the flat sheet are disposed adjacent to each other in parallel with the plate surfaces (3a) and (3b) of the Peltier element (30), in other words, such a structure in which the generally flat base sheet of the respective honeycomb sheets is disposed in parallel with the plate surfaces (3a) and (3b) of the Peltier element (30). The opening of each of the air-passing cells on the side of an end of the element (33) (on both end sides thereof in a flowing direction of the air) is formed into a generally triangular shape by bonding each convex portion of the corrugated base sheet to the flat base sheet adjacent thereto.

Alternatively, the element (33) of a corrugated type structure may be formed into such a configuration as shown in FIG. 3. More specifically, the element (33) shown in FIG. 3 has such a structure in which a plurality of honeycomb sheets each having a row of cells formed by overlapping the corrugated base sheet on the flat base sheet are disposed adjacent to each other in the direction perpendicular to the plate surfaces (3a) and (3b) of the Peltier element (30), that is, such a structure in which the honeycomb sheets are disposed along each of the plate surfaces (3a) and (3b) of the Peltier element (30), in other words, the element (33) has such a structure in which the generally flat base sheet of the respective honeycomb sheets is disposed in the direction perpendicular to the plate surfaces (3a) and (3b) of the Peltier element (30). When the element (33) in which the honeycomb sheets thereof are disposed in the direction perpendicular to the plate surfaces (3a) and (3b) of the Peltier element (30) as described above, is used as each of the adsorption components (31) and (32), warm heat and cold heat generated from the Peltier element (30) can be uniformly and efficiently transferred to the respective honeycomb sheets constituting the element (33) of each of the adsorption components (31) and (32), thereby further enhancing the heating and cooling effect by the Peltier element (30).

The honeycomb sheets used in the element (33) of the respective adsorption components (31) and (32) as shown in FIGS. 2 and 3 may be produced using a so-called honeycomb shaping machine in which two kinds of base sheets that are different in length from each other are alternately laminated and bonded to each other at constant intervals while drawing the longer base sheet into a corrugated shape. In this case, the flat base sheet and the corrugated base sheet adjacent thereto are bonded to each other by heat welding, ultrasonic welding or by using an adhesive. The element (33) may be produced by forming honeycomb sheets having, for example, a corrugated type structure which are constituted from ceramic papers as the base sheets, according to the above method; laminating the honeycomb sheets to form a structural body of the element; and immersing the thus obtained structural body of the element in a slurry comprising an adsorbent, a binder and a solvent. Meanwhile, the method for production of the honeycomb sheet itself is known in the art, and described, for example, in Japanese Patent Application Laid-open (KOKAI) No. 2004-209420.

In addition, in the first and second adsorption components (31) and (32), the air-passing area of each of the adsorption components (total opening area in section of the element (33) perpendicular to a flow direction of the air) is preferably adjusted to not less than a minimum sectional area of each of the air passages on the upstream and downstream sides of the adsorbent module (3) (an opening area in the direction perpendicular to a flow direction of the air). When the air-passing area of each of the adsorption components (31) and (32) is set as specified above, it is possible to reduce a flow rate of the air passing through each of the adsorption components (31) and (32), thereby further enhancing adsorption and desorption functions thereof.

Further, the inside of the respective adsorption components (31) and (32) may have a larger area in section perpendicular to a flow direction of the air, than an opening area of each component at an air inlet and an air outlet thereof. When the sectional area of the inside of the respective adsorption components (31) and (32) is increased as described above, it is possible to reduce a pressure loss of the air passing therethrough in side peripheries of the respective adsorption components in the vicinity of the inlet and outlet in the width direction thereof (left-to-right direction in a plan view thereof), so that the respective adsorption components (31) and (32) can be enhanced in adsorption and desorption efficiency.

Figure 7:
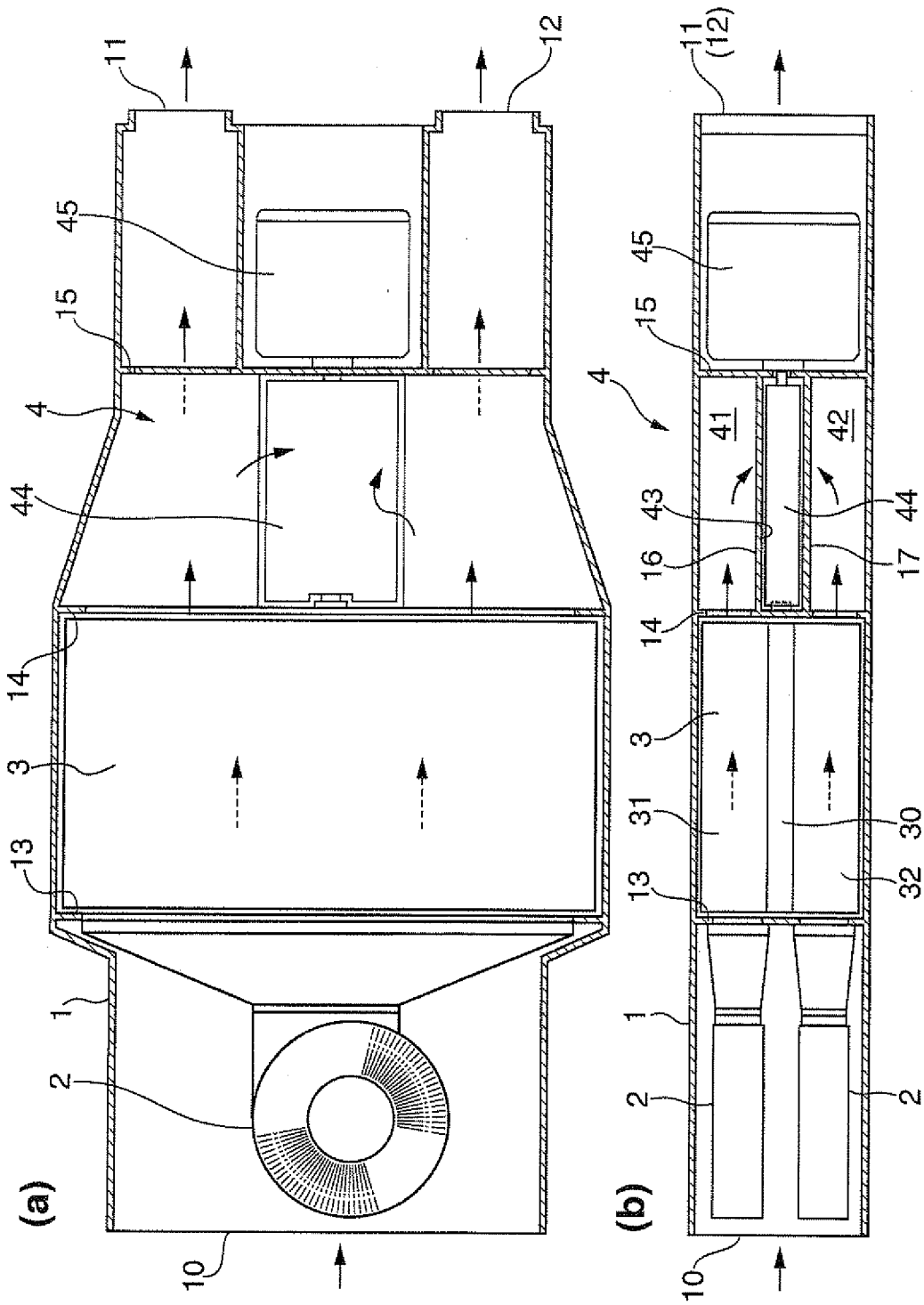
FIG. 7 are a plan view and a side view showing, partially broken away, the other example of a structure of a dehumidification and humidification apparatus for vehicles according to the present invention.

Also, in the present invention, in order to reduce a flow rate of the air passing through an inside of the respective adsorption components (31) and (32) for enhancing adsorption and desorption functions thereof, for example as shown in FIG. 7, the adsorbent module (3) may have a larger width than that of those portions of the casing (1) in which the blower (1) or the air passage switching device (4) is accommodated. In this case, the casing (1) may be constructed such that the width of the portion of the casing (1) on the downstream side of the blower (2) is gradually increased toward the inlet of the adsorbent module (3), and the width of the portion of the casing (1) on the downstream side of the adsorbent module (3) is gradually decreased toward the first and second blowoff ports (11) and (12) (refer to FIG. 7(a)).

Figure 8:
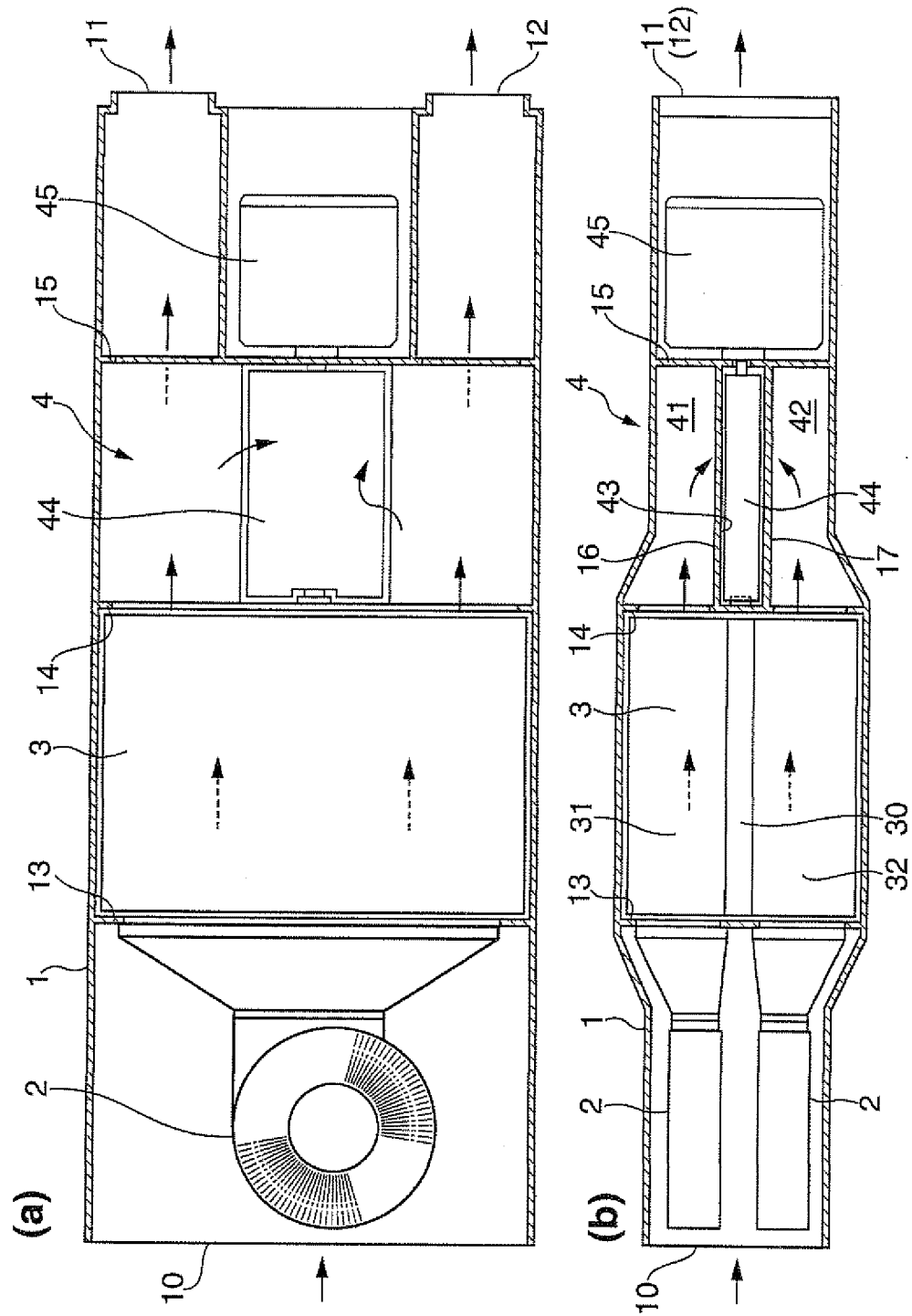
FIG. 8 are a plan view and a side view showing, partially broken away, the still other example of a structure of a dehumidification and humidification apparatus for vehicles according to the present invention.

Further, in the present invention, for the same purpose as described above, for example as shown in FIG. 8, the adsorbent module (3) may have a larger thickness than the thicknesses of those portions of the casing (1) in which the blower (1) and the air passage switching device (4) are accommodated. In this case, the casing (1) may be constructed such that the thickness of its portion on the downstream side of the blower (2) is gradually increased toward the inlet of the adsorbent module (3), and the thickness of the portion of the casing (1) on the downstream side of the adsorbent module (3) (portion where the air passage switching device (4) is disposed) is gradually decreased toward the first and second blowoff ports (11) and (12) (refer to FIG. 8(b)).

In the present invention, for example in order to sufficiently dehumidify the air being blown off from the first blowoff port (11) for preventing fogging of window glass and efficiently humidify the air being blown off from the second blowoff port (12) toward passenger side, for example in the winter season, as the adsorbent supported on the element (33), there may be used silica, mesoporous silica, alumina, activated carbon, zeolite, etc. Such an adsorbent preferably has the following adsorption characteristics.

That is, the air circulating through the compartment of vehicles upon heating in the winter season has a comparatively low relative humidity ranging from about 25 to about 50% as measured at 25° C. However, depending upon the air blown off from the first blowoff port (11), in order to attain a good antifogging effect on window glass maintained at a comparatively low temperature, for example, at 5° C., it is required that the adsorbent has a property capable of sufficiently adsorbing water even under the above low humidity condition for reducing the relative humidity of the air being blown off therefrom to not more than about 20%.

On the other hand, although the above-described Peltier element (30) is used for regenerating the adsorbent, in view of reducing a power consumption required therefor, it is desirable that the adsorbent desorbs water even at a comparatively low temperature not higher than 90° C. and preferably not higher than 70° C. In the case where the compartment of vehicles is kept in an adequate comfortable condition, for example, at a temperature of 25° C. and a humidity of 50%, the air passing through the element (33) exhibits a relative humidity of 2% when heated to 90° C. by the Peltier element (30) and a relative humidity of 4% when heated to 70° C. by the Peltier element (30). Therefore, it is required that the adsorbent has such a property capable of easily adsorbing and desorbing water in a relative humidity range of 2 to 25% and preferably 4 to 25%.

In addition, the adsorption and desorption amounts as required for the adsorbent are as follows. That is, when the air in the compartment of vehicles is fed to window glass for preventing fogging thereof, the air is generally blown at a flow rate of about 120 $m^3$/h. In this case, in order to prevent dewing on window glass having a temperature of 5° C., the air blown off is preferably dehumidified below its absolute humidity in the saturated condition at 5° C., i.e., not higher than about 5 g/kg. Since the air in the compartment which is kept at a temperature of 25° C. and a humidity of 50% as described above has an absolute humidity of 9.8 g/kg, it is required that the air flowing at a rate of 120 $m^3$/h (=15.5 kg/h) is dehumidified by not less than 4.8 g/kg. Therefore, the adsorbent is preferably capable of adsorbing, for example, 750 g/h of water depending upon the kind thereof.

Further, in order to humidify the air in the compartment of vehicles and feed the humidified air toward passenger side without discomfort, it is desirable that the air is blown off, for example, at an air flow velocity of 1 to 2 m/s in an air flow amount of 4.7 $m^3$/h. In this case, if it is intended that the air sucked from the intake port (10) which has a temperature of 20° C., a relative humidity of 30% and an absolute humidity of 4.35 g/kg (DA) is blown off in the form of a humidified air having a temperature of 25° C., a relative humidity of 40% and an absolute humidity of 7.91 g/kg (DA) from the second blowoff port (12) toward passenger side, it is required that the absolute humidity of the air is increased by 1.82 g/kg (DA), i.e., the air must be humidified by 10.3 g/h in terms of amount of water when the air flow amount is kept as described above.

On the other hand, in the operation of the adsorbent module (3), as described hereinlater, the first adsorption component (31) and the second adsorption component (32) are alternately switched in their operation between adsorption and desorption. When the number of switching between the adsorption and desorption operations is 12 times/h, it is required that the adsorbent adsorbs and desorbs about 0.85 g of water in each adsorption and desorption operation of the adsorption components (31) and (32). In addition, upon practical use, it is required to achieve further downsizing of the respective adsorption components (31) and (32) in order to incorporate these components into the casing (1) having a still smaller size. In the case where the respective elements (33) are designed to have a total effective volume (apparent volume thereof when the adsorbent is supported thereon) of 35 $cm^3$, the total mass of the adsorbent supported on both of the elements (33) sums to about 6 g. Therefore, the adsorbent is required to have an adsorption/desorption amount of at least 0.14 g/g.

More specifically, in the present invention, it is required that the adsorbent supported on the respective elements (33) of the adsorbent module (3) has such an adsorption characteristic that the difference between its adsorption amount at a relative humidity of 25% and that at a relative humidity of 2% in a water vapor adsorption isothermal curve as measured at 25° C. is not less than 0.14 g/g. It is preferred that the difference between the adsorption amount at a relative humidity of 25% and that at a relative humidity of 4% be not less than 0.14 g/g. The kind of the adsorbent used is not particularly limited as long as it can exhibit the above-described adsorption characteristic. Examples of the adsorbent include silica, mesoporous silica, alumina, activated carbon and zeolite.

In the present invention, as one of the adsorbents satisfying the above adsorption characteristic, there may be exemplified zeolite capable of easily adsorbing water vapor at a low humidity and desorbing water vapor at a low temperature. Examples of the zeolite include aluminosilicates and aluminophosphates of FAU types having a silica/alumina ratio of not less than 2.5. Among these adsorbents, preferred are crystalline aluminophosphates having a skeletal structure comprising at least Al and P. From the viewpoint of enhancing diffusion of water vapor in individual particles of the adsorbent, the size of particles of the adsorbent (average particle diameter) is usually 0.1 to 300 μm, preferably 0.5 to 250 μm, more preferably 1 to 200 μm and most preferably 2 to 100 μm.

The above aluminophosphates (hereinafter appropriately referred to merely as "ALPOs") are in the form of crystalline aluminophosphates prescribed by IZA (International Zeolite Association). The crystalline aluminophosphates comprise aluminum and phosphorus as atoms constituting a framework structure thereof which may be partially substituted with other atoms. Among these crystalline aluminophosphates, from the viewpoint of a good adsorption property, preferred are (I) Me-aluminophosphates in which aluminum is partially substituted with a heteroatom Me1 wherein Me1 represents at least one element selected from the group consisting of elements of Groups 2A, 7A, 8, 1B, 2B and 3B except for Al belonging to the third or fourth period of the Periodic Table; (II) Me-aluminophosphates in which phosphorus is partially substituted with a heteroatom Me2 wherein Me2 represents at least one element selected from the group consisting of elements of Groups 4B belonging to the third or fourth period of the Periodic Table; and (III) Me-aluminophosphates in which both aluminum and phosphorus are partially substituted with the heteroatoms Me1 and Me2, respectively.

The aluminophosphates may comprise one or more kinds of heteroatoms Me. Examples of the preferred Me (Me1, Me2) include elements belonging to the third or fourth period of the Periodic Table. The Me1 is preferably a divalent element having an ionic radius of not less than 3 nm and not more than 0.8 nm, and more preferably a divalent tetra(4-)coordinated element having an ionic radius of not less than 0.4 nm and not more than 7 nm. Among these elements, from the viewpoints of a facilitated synthesis and a good adsorption property, preferred is at least one element selected from the group consisting of Fe, Co, Mg and Zn, and more preferred is Fe. The heteroatom Me2 is an element of Group 4B belonging to the third or fourth period of the Periodic Table, and Me2 is preferably Si.

Also, the above aluminophosphates used in the present invention usually have a framework density (FD) of not less than 13 T/nm$^3$ and not more than 20 T/nm$^3$. The lower limit of the framework density of the aluminophosphates is preferably not less than 13.5 T/nm$^3$ and more preferably not less than 14 T/nm$^3$, whereas the upper limit of the framework density of the aluminophosphates is preferably not more than 19 T/nm$^3$. When the framework density of the aluminophosphates is less than the above-specified range, the aluminophosphates tend to have an unstable structure and be deteriorated in durability. On the other hand, when the framework density of the aluminophosphates is more than the above-specified range, the aluminophosphates tend to have a low adsorption capacity and be unsuitable for practical use as an adsorbent. Meanwhile, the "framework density" (unit: T/nm$^3$) as used herein means the number of T atoms present per unit volume (nm$^3$) (the number of constitutional elements other than oxygen in the framework structure per 1 nm$^3$ of zeolite).

Examples of the structure of the aluminophosphates as expressed by the structural codes prescribed by IZA include AEI, AEL, AET, AFI, AFN, AFR, AFS, AFT, AFX, ATO, ATS, CHA, ERI, LEV and VFI. Among these aluminophosphates, from a good adsorption property and a good durability, preferred are those aluminophosphates having structures of AEI, AEL, AFI, CHA and LEV, and more preferred are those aluminophosphates having structures of AFI and CHA.

Among the above aluminophosphates as the adsorbent, especially preferred are SAPO-34 and FAPO-5. These ALPOs may be used singly or in combination of any two or more kinds thereof. The conditions for production of FAPO and SAPO are not particularly limited. The FAPO and SAPO may be usually produced by mixing an aluminum source, a phosphorus source, an optional Me source such as Si and Fe, if required, and a template with each other, and then subjecting the resulting mixture to hydrothermal synthesis. Also, the ALPOs may be synthesized by known production methods as described, for example, in Japanese Patent Publication (KOKOKU) No. 1-57041(1989) and Japanese Patent Application Laid-Open (KOKAI) Nos. 2003-183020 and 2004-136269.

Figure 10:
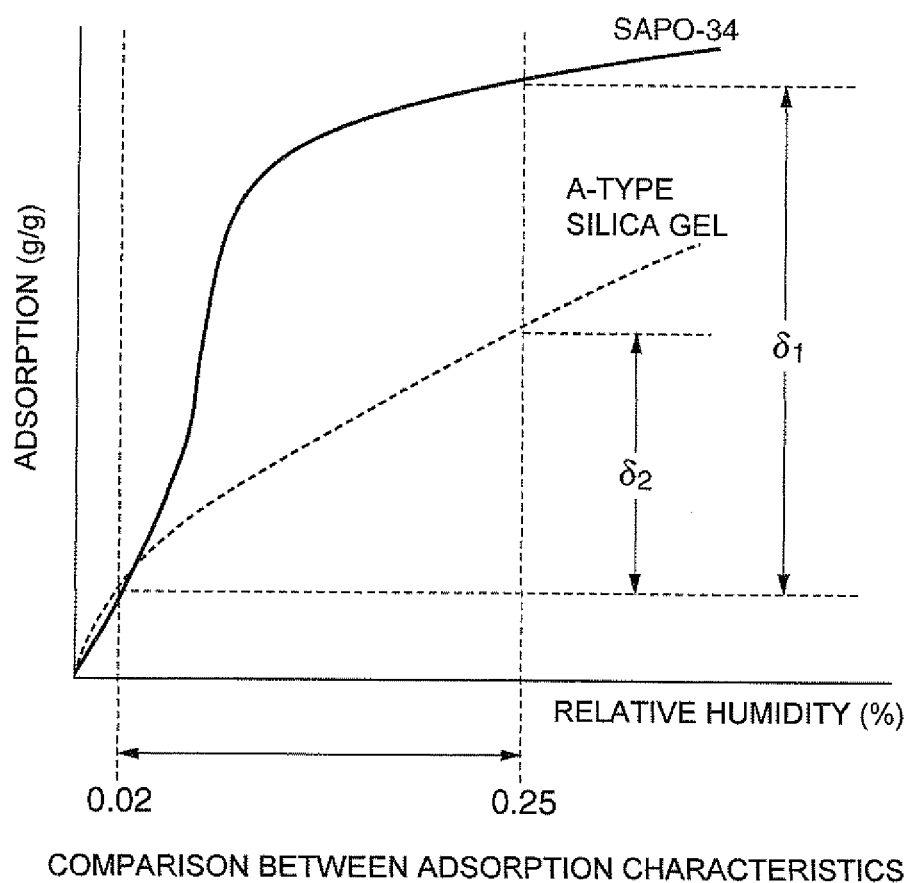
FIG. 10 is a water vapor adsorption isothermal curve showing adsorption characteristic of an absorbent suitably used in a dehumidification and humidification apparatus for vehicles according to the present invention.

The adsorbent suitably used in the dehumidification and humidification apparatus of the present invention, for example, crystalline silicoaluminophosphate (SAPO-34), exhibits an adsorption characteristic shown by the solid line in FIG. 10. In the water vapor adsorption isothermal curve at 25° C., the adsorption amount of the adsorbent is rapidly changed in a relative humidity range between 2% and 25%, and the difference ($\delta_1$) in adsorption amount therebetween reaches not less than 0.15 g/g. On the other hand, the conventional adsorbent, for example, A-type silica gel or activated carbon, exhibits an adsorption characteristic as shown by the broken line in FIG. 10. In the water vapor adsorption isothermal curve of the conventional adsorbent at 25° C., the change in adsorption amount in a relative humidity range between 2% and 25% is small, and the difference ($\delta_2$) in adsorption amount therebetween is not more than ½ time the difference ($\delta_1$) of SAPO-34. That is, the adsorbent used in the present invention exhibits such a property capable of adsorbing and desorbing a larger amount of water even in a low humidity range.

In addition, in the dehumidification and humidification apparatus of the present invention, the first adsorption component (31) and the second adsorption component (32) of the adsorbent module (3) are respectively replaceable in order to facilitate maintenance thereof. More specifically, the adsorbent module (3) is accommodated in the casing (1) as shown in FIG. 1 such that the respective adsorption components (31) and (32) are closely contacted with the Peltier element (30) without being fixed thereto. The adsorbent module (3) is detachable from the casing (1), for example, by opening a lid (not shown) provided on the casing (1). With such a construction, only the adsorption component (31) or (32) which has been deteriorated in adsorption performance can be replaced with a new one.

In the dehumidification and humidification apparatus of the present invention, the respective adsorption components (31) and (32) of the adsorbent module (3) is alternately switched between adsorption and desorption operations. Therefore, in the present invention, in order to continuously blow off the dehumidified air from the first blowoff port (11) and continuously blow off the humidified air from the second blowoff port (12), the air passage switching device (4) is disposed on the downstream side of the adsorbent module (3) as shown in FIG. 1. The air passage switching device (4) is constructed such that the air passing through the first adsorption component (31) of the adsorbent module (3) and the air passing through the second adsorption component (32) of the adsorbent module (3) can be respectively turned toward the first blowoff port (11) and the second blowoff port (12) of the casing (1), and the turning directions of the respective airs can be switched.

As the mechanism for conducting switching between the air passages, there may be used the mechanism in which two flexible conduits are moved to change portions to be connected therewith, the mechanism in which two shutters synchronously operated by means of links, etc., are alternately opened and closed to change portions to be connected therewith, and the mechanism in which two concentric rotary shutters disposed adjacent to each other and perpendicular to each other as viewed from a side thereof are each rotated 90° to change portions to be connected therewith. From the viewpoints of simplified structure and downsizing of the apparatus, as shown as an example in FIG. 1, the air passage switching device (4) is constructed such that the turning directions of the respective airs are switched by a damper (44) rotatably operated by an actuator (45).

More specifically, the air passage switching device (4) comprises a first introduction chamber (41) disposed in an upper portion of the casing into which the air passing through the adsorbent module (3) is flowed, a second introduction chamber (41) disposed in a lower portion of the casing into which the air passing through the adsorbent module (3) is also flowed, a distribution chamber (43) disposed between these introduction chambers (41) and (42), the damper (44) for switching the air flows, and the actuator (45) for operating the damper.

Figure 4:
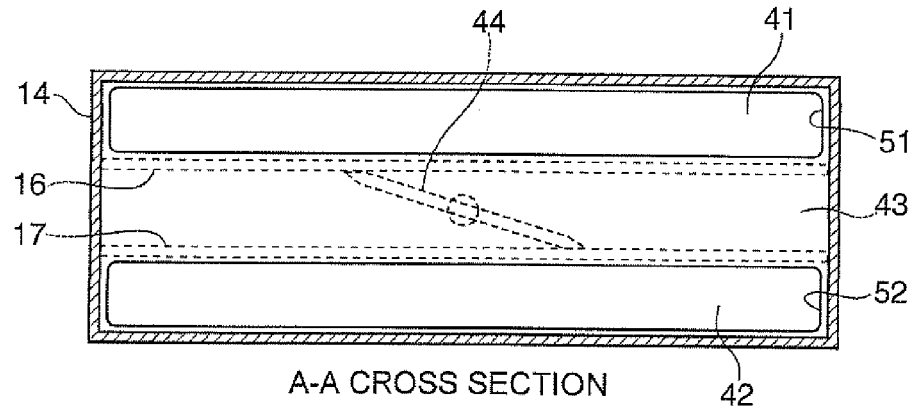
FIG. 4 is a sectional view taken along the line A-A of FIG. 1 which shows one of ribs of a casing which is disposed in an air intake port portion of an air passage switching device.

The first introduction chamber (41), the second introduction chamber (42) and the distribution chamber (43) are respectively defined by the above-described rib (14), a rib (15) disposed on the downstream side of the rib (14), both side walls, a ceiling and a bottom of the casing (1), and two partitions (16) and (17) horizontally extending to divide a space between the ribs (14) and (15) into three vertical stages (refer to FIGS. 1(b) and 4).

As shown in FIGS. 1(b) and 4, the first introduction chamber (41) is formed in an upper portion of the casing (1), and constructed such that the air passing through the first adsorption component (31) of the adsorbent module (3) is flowed thereinto through the introduction port (51) formed in an upper portion of the rib (14). On the other hand, the second introduction chamber (42) is formed in a lower portion of the casing (1), and constructed such that the air passing through the second adsorption component (32) of the adsorbent module (3) is flowed thereinto through the introduction port (52) formed in a lower portion of the rib (14).

Figure 5:
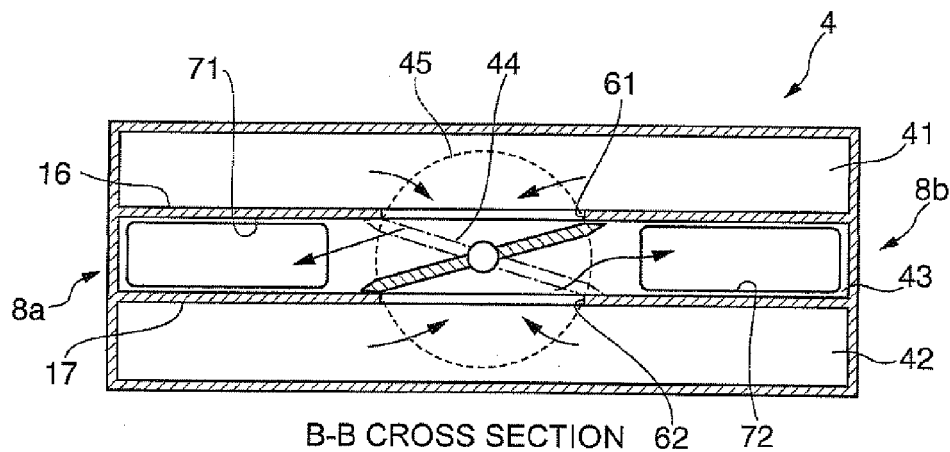
FIG. 5 is a sectional view taken along the line B-B of FIG. 1 which shows an internal structure of an air passage switching device.

The distribution chamber (43) is a space for turning the air toward a desired direction in cooperation with the damper (44), and disposed between the first introduction chamber (41) and the second introduction chamber (42) as shown in FIGS. 1(b) and 4. As shown in FIG. 5, the two partitions (16) and (17) dividing the space between the ribs (14) and (15) into three vertical stages are respectively provided at a center thereof with a vent hole (holes represented by reference numerals (61) and (62)) which each serve as an inlet of the air into the distribution chamber (43). The rib (15) is provided at its positions corresponding to a height of the distribution chamber (43) with left and right vent holes (holes represented by reference numerals (71) and (72)) which each serve as an outlet of the air from the distribution chamber (43).

More specifically, the distribution chamber (43) is provided with a first inlet port (61) and a second inlet port (62) which are communicated with the above introduction chambers (41) and (42), respectively, so as to flow the respective airs from the introduction chambers (41) and (42) thereinto. The distribution chamber (43) is further provided with a first outlet port (71) and a second outlet port (72) which are communicated with the first blowoff port (11) and the second blowoff port (12), respectively, of the casing (1) so as to flow out the air in the distribution chamber toward the respective blowoff ports (11) and (12).

Figure 6:
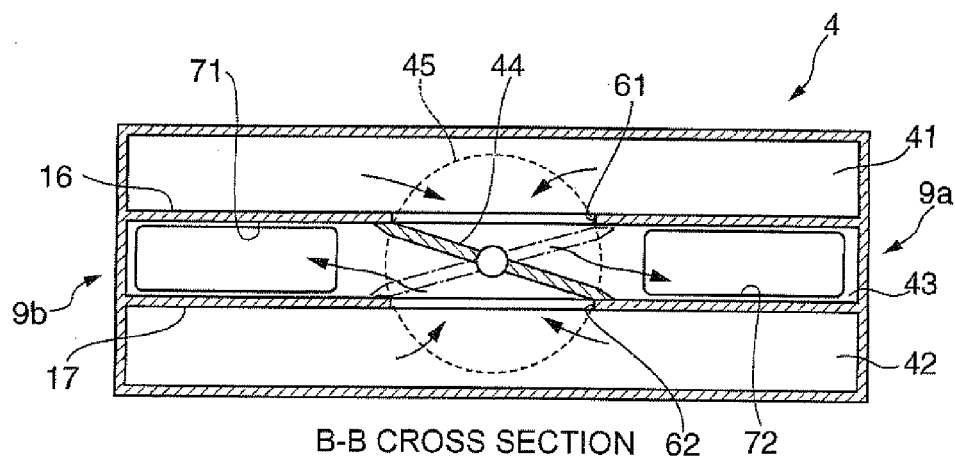
FIG. 6 is a sectional view taken along the line B-B of FIG. 1 which shows an internal structure of an air passage switching device.

As shown in FIGS. 1(a), 5 and 6, the damper (44) is disposed at a center of the distribution chamber (43), in other words, between the first inlet port (61) and the second inlet port (62), and constructed so as to be rotatable by a predetermined angle about an axis perpendicular to a plate surface of each of the ribs (14) and (15). The damper (44) is operated by the actuator (45) disposed on the side (downstream side) opposite to the distribution chamber (43) relative to the rib (15). The left and right side edges of the damper (44) are contacted with the partitions (16) and (17), respectively, to divide an inside of the distribution chamber (43) into two spaces. As the actuator (45), a stepping motor of a geared type may be usually used in order to allow the damper (44) to rotate only at a predetermined angle in forward and reverse directions.

When the damper (44) is rotated in one direction, as shown in FIG. 5, the distribution chamber (43) is divided into a space (8a) including the first inlet port (61) and the first outlet port (71) and a space (8b) including the second inlet port (62) and the second outlet port (72). When the damper (44) is rotated in the other direction, as shown in FIG. 6, the distribution chamber (43) is divided into a space (9a) including the first inlet port (61) and the second outlet port (72) and a space (9b) including the second inlet port (62) and the first outlet port (71).

In the dehumidification and humidification apparatus of the present invention, in order to continuously blow off the dehumidified air from the first blowoff port (11) and continuously blow off the humidified air from the second blowoff port (12), an electric current flowing through the Peltier element (30) of the adsorbent module (3) is reversed, for example, at predetermined time intervals to switch operations of the Peltier element between a heat-absorbing portion and a radiating portion. The air passage switching device (4) is constructed such that turning directions of the air passing through the first adsorption component (31) of the adsorbent module (3) and the air passing through the second adsorption component (32) of the adsorbent module (3) are switched in response to reversal of the electric current.

More specifically, in the adsorbent module (3), the electric current flowing through the Peltier element (30) is reversed in the time intervals according to the adsorption and desorption operations of the respective adsorption components (31) and (32), for example, at intervals of 30 to 60 sec, so as to switch the operations of the plate surfaces (3a) and (3b) of the Peltier element (30) between a heat-absorbing operation to a radiating operation. Also, in the air passage switching device (4), simultaneously with the reversal of the electric current flowing through the Peltier element (30) or after the elapse of a predetermined time from the reversal of the electric current, the damper (44) is operated such that the turning direction of one of the airs treated in the adsorbent module (3) is switched from the first blowoff port (11) to the second blowoff port (12), and the turning direction of the other of the airs treated in the adsorbent module (3) is switched from the second blowoff port (12) to the first blowoff port (11). The timing of operating the air passage switching device (4) is subsequent to the reversal of electric current flowing through the Peltier element (30) and until the temperatures of the respective plate surfaces (3a) and (3b) of the Peltier element (30) are reversed from high temperature to low temperature and vice versa, usually subsequent to the reversal of electric current and until the time of about 30 to 60 sec elapses from the reversal of electric current. Thus, by operating the damper (44) after the elapse of a predetermined time to switch the turning directions of the airs treated in the adsorbent module, it is possible to produce the dehumidified air and the humidified air in a more efficient manner.

Meanwhile, although not shown in the figures, the dehumidification and humidification apparatus of the present invention may further comprise a controller for controlling an electric current flowing through the Peltier element (30) of the adsorbent module (3) and controlling the actuator (45) in the air passage switching device (4). The first blowoff port (11) is connected with an air channel as a defroster blowoff port directed to window glass, whereas the second blowoff port (12) is connected with a face blowoff port directed to passenger side.

The dehumidification and humidification apparatus of the present invention is operated, for example, in the winter season in which outside air is dried, in the following manner. That is, the blower (2) sucks the air in the compartment of vehicle and feeds the air to the first adsorption component (31) and the second adsorption component (32) of the adsorbent module (3), respectively. In the adsorbent module (3), for example, since one of the plate surfaces (3a) of the Peltier element (30) functions as a heat-absorbing portion and the other of the plate surfaces (3b) of the Peltier element (30) functions as a radiating portion, the first adsorption component (31) is cooled by the plate surface (3a), and the adsorption operation of the adsorbent supported on the element (33) of the first adsorption component (31) is allowed to proceed, so that water vapor in the air passing through the element (33) is adsorbed in the adsorbent. On the other hand, the second adsorption component (32) is cooled by the plate surface (3b) of the Peltier element (30), and the desorption operation of the adsorbent supported on the element (33) of the second adsorption component (32) is allowed to proceed, so that water vapor in the air passing through the element (33) is released therefrom.

The dehumidified air passing through the first adsorption component (31) of the adsorbent module (3) and the humidified air passing through the second adsorption component (32) are flowed through the introduction ports (51) and (52) (refer to FIG. 4) into the first introduction chamber (41) and the second introduction chamber (42), respectively, of the air passage switching device (4). In the air passage switching device (4), as shown in FIG. 5, since the damper (44) is kept in a state rotated in one direction, the distribution chamber (43) is divided into the space (8a) and the space (8b). More specifically, the distribution chamber (43) is divided into the space (8a) including the first inlet port (61) and the first outlet port (71) and the space (8b) including the second inlet port (62) and the second outlet port (72) by means of the damper (44). Therefore, the dehumidified air flowed into the first introduction chamber (41) is fed through the first outlet port (71) into the first blowoff port (11) (refer to FIG. 1). On the other hand, the humidified air flowed into the second introduction chamber (42) is fed through the second outlet port (72) into the second blowoff port (12) (refer to FIG. 1).

After the adsorption operation and the desorption operation in the adsorbent module (3) is performed for a predetermined period of time, the electric current flowing through the Peltier element (30) is reversed to conduct switching between the heat-adsorbing portion and the radiating portion of the Peltier element (30). In other words, the plate surface (3a) of thee Peltier element (30) functions as the heat-adsorbing portion, whereas the plate surface (3b) of thee Peltier element (30) functions as the radiating portion. By switching functions of the plate surfaces (3a) and (3b) of the Peltier element (30), the operations of the adsorbents in the respective adsorption components (31) and (32) are also reversed and switched between the adsorption operation and the desorption operation.

More specifically, in the first adsorption component (31), the previously cooled element (33) is heated so that water vapor adsorbed therein is desorbed. On the other hand, in the second adsorption component (32), the previously heated element (33) is cooled so that adsorption of water vapor therein is initiated. As a result, the first adsorption component (31) releases water vapor to humidify the air passing therethrough, whereas the second adsorption component (32) adsorbs water vapor from the air passing therethrough to dehumidify the air, so that the humidified air is flowed into the first introduction chamber (41) of the air passage switching device (4) and the dehumidified air is flowed into the second introduction chamber (42).

Also, when the electric current flowing through the Peltier element (30) is reversed, for example after the elapse of 0 to 60 sec from the reversal of the electric current, the air passages are switched by the air passage switching device (4). More specifically, in the air passage switching device (4), the actuator (45) is operated, and the damper (44) is rotated in the other direction from the state shown in FIG. 5 to the state shown in FIG. 6 to thereby divide an inside of the distribution chamber (43) into the space (9a) and the space (9b). As shown in FIG. 6, when the damper (44) is rotated in the other direction, the distribution chamber (43) is divided into the space (9a) including the first inlet port (61) and the second outlet port (72) and the space (9b) including the second inlet port (62) and the first outlet port (72) by means of the damper (44). Therefore, the humidified air in the first introduction chamber (41) is flowed into the space (9a) of the distribution chamber (43), and fed through the second outlet port (72) to the second blowoff port (12) (refer to FIG. 1). On the other hand, the dehumidified air in the second introduction chamber (42) is flowed into the space (9b) of the distribution chamber (43), and fed through the first outlet port (71) to the first blowoff port (11) (refer to FIG. 1).

In the dehumidification and humidification apparatus of the present invention, the adsorption and desorption operations of the adsorbent module (3) are reversed at a predetermined intervals as described above, and the air passages into which the dehumidified air and the humidified air are respectively blown off are switched by the air passage switching device (4) in response to the reversal of the adsorption and desorption operations. As a result, it is possible to continuously blow off the dehumidified air through the first blowoff port (11) and continuously blow off the humidified air through the second blowoff port (12). The dehumidified air is used for preventing fogging of window glass, whereas the humidified air is used for improving comfortableness in the compartment of vehicles.

As described above, in the dehumidification and humidification apparatus of the present invention, the adsorbent module (3) is constructed such that a pair of the adsorption components (31) and (32) of a fixed type supporting the adsorbent thereon are directly disposed on the respective plate surfaces of the Peltier element (30) which function as a heat-absorbing portion and a radiating portion, respectively. In the adsorbent module (3), the electric current flowing through the Peltier element (30) is reversed to switch functions of the plate surfaces of the Peltier element (30) between the heat-absorbing portion and the radiating portion, so that the heating and cooling of the respective adsorption components (31) and (32) are switched, and the adsorption operation and the desorption operation thereof are reversed. Further, in response to the reversal between the adsorption operation and the desorption operation, the turning directions of the air passing through the first adsorption component (31) and the air passing through the second adsorption component (32) are switched by the air passage switching device (4).

Therefore, in the dehumidification and humidification apparatus of the present invention, it is not required to provide any rotational drive member such as an adsorption rotor used in the conventional apparatuses. In addition, since the respective adsorption components (31) and (32) are directly disposed on the Peltier element (30), heat transfer between the adsorption components (31) and (32) and the Peltier element (30) is increased upon heating and cooling the respective adsorption components, so that the adsorption components (31) and (32) and the Peltier element (30) can be further downsized. As a result, it is possible to simplify a structure of the apparatus and further reduce a size of the apparatus as a whole.

Further, in the dehumidification and humidification apparatus of the present invention, as described above, the first adsorption component (31) and the second adsorption component (32) of the adsorbent module (3) are respectively replaceable. Therefore, when the respective adsorption components are deteriorated in adsorption performance owing to clogging or adsorption of substances other than water vapor therein, the adsorbent module (3) can be taken out of the casing (1) to replace the respective adsorption components (31) and (32) with new ones. With such a construction, the performance of the apparatus can be restored only by replacing the deteriorated adsorption component (31) or (32) with a new one. In addition, merely by replacing the respective adsorption components at the intervals of several years without using a filter, the apparatus can be kept in a maintenance-free condition for a long period of time, so that the costs required for maintenance thereof can be reduced.

Meanwhile, examples of the substances other than water vapor which are undesirably adsorbed by the adsorbent include VOC 13 substances (such as formaldehyde, acetaldehyde, toluene, xylene, ethyl benzene, styrene, p-dichlorobenzene, tetradecane, di-n-butyl phthalate, di-2-ethylhexyl phthalate, diazinon, fenobucarb and chlorpyrifos), and odorous materials such as acetic acid, fatty acids (such as n-butyric acid), amines and ammonia. In the above construction in which the first adsorption component (31) and the second adsorption component (32) are replaceable, it is possible to prevent the above odorous materials, etc., which are concentrated when the inside temperature of the compartment is raised, from being released again into the compartment.

Although not shown in the figures, in the dehumidification and humidification apparatus of the present invention, in order to blow off more comfortable air toward passenger side, a heat exchanger for conducting a sensible heat exchange between the air dehumidified (humidified) by the adsorption component (31) of the adsorbent module (3) and the air humidified (dehumidified) by the adsorption component (32) may be disposed on the downstream side of the adsorbent module (3).

For example, the humidified air blown off from the second blowoff port (12) toward passenger side is the air comprising water desorbed from the respective adsorption components (31) and (32). However, the humidified air tends to be sometimes heated to more than necessary high temperature by heat generated from the Peltier element (30) upon the heating desorption. On the other hand, for example, the dehumidified air blown off from the first blowoff port (11) toward the side of window glass tends to be cooled to lower temperature owing to cooling by the Peltier element (3). To solve these problems, in the present invention, the heat exchanger may be disposed on the downstream side of the adsorbent module (3) for decreasing the temperature of the humidified air and raising the temperature of the dehumidified air.

As the heat exchanger, there may be used various types of heat exchangers such as sensible heat exchangers of a block shape which are produced from metals having a high heat conductivity such as aluminum and provided on the surface thereof with a large number of fins, and sensible heat exchangers of a perpendicular type which comprise a plurality of parallel flat plates formed from the same metals as described above and in which high-temperature air and low-temperature air are flowed through adjacent two spaces between the flat plates. The heat exchanger may be disposed to span between the air passage communicated with the first blowoff port (11) and the air passage communicated with the second blowoff port (12). When the heat exchanger is disposed in such a state as described above, heat exchange between the humidified air having a high temperature and the dehumidified air having a low temperature can be well performed, so that comfortable air that is humidified and has an appropriately reduced temperature can be blown off toward passenger side, for example, in the winter season.

Further, the heat exchanger is preferably disposed on the downstream side of the air passage switching device (4). When the heat exchanger is disposed on the downstream side of the air passage switching device (4), as compared to the case where the heat exchanger is disposed between the adsorbent module (3) and the air passage switching device (4), no switching between the air passages for the high-temperature air and the low-temperature air are not caused in the heat exchanger and, therefore, no heat loss in the heat exchanger occurs, so that the heat exchange between the airs can be efficiently conducted, and the temperature of the humidified air blown off toward passenger side can be lowered.

Figure 9:
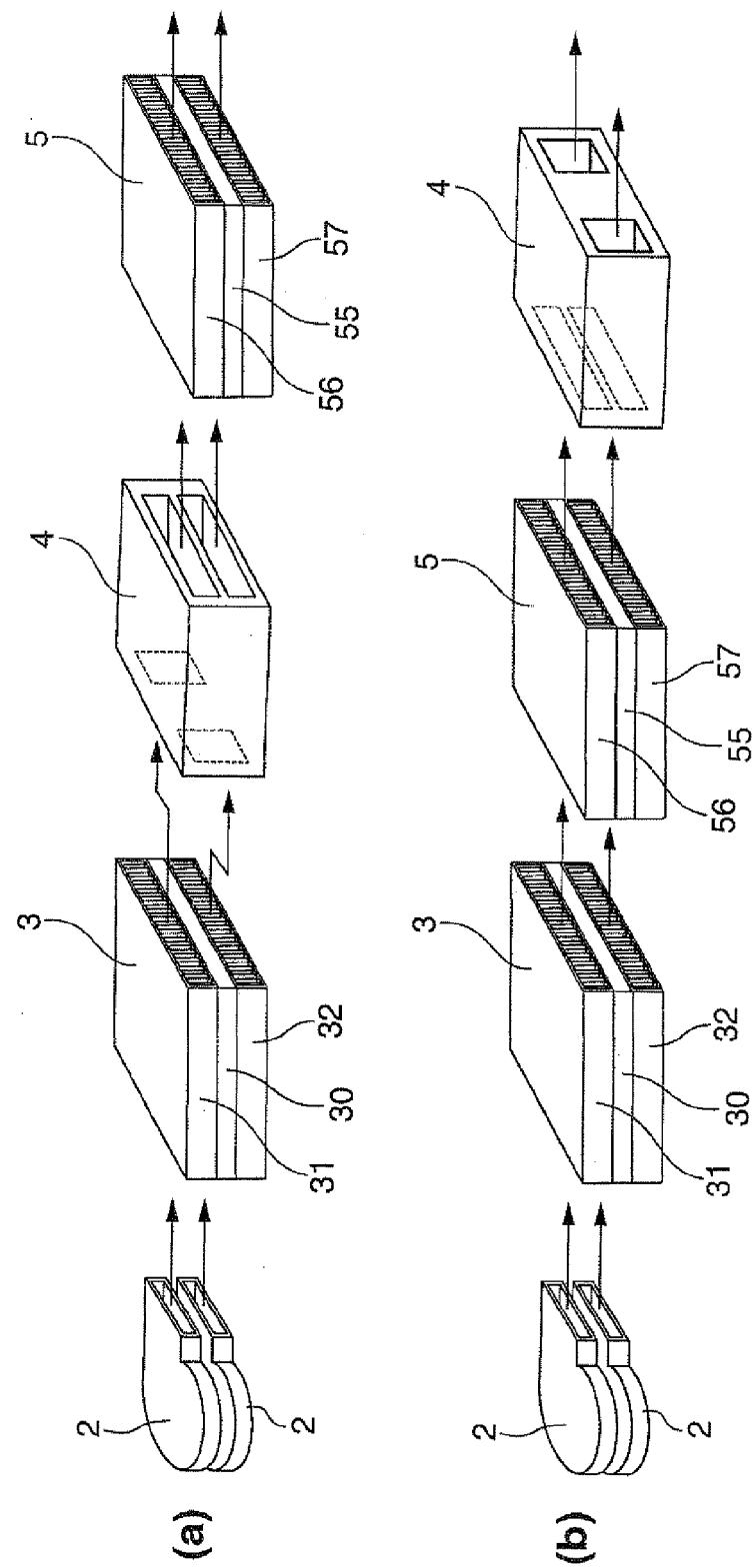
FIG. 9 are block diagrams each showing an example of a structure of a dehumidification and humidification apparatus according to the present invention which has a function for decreasing a temperature of humidified air and increasing a temperature of dehumidified air.

Further, in the present invention, in order to decrease the temperature of the humidified air fed from the adsorbent module (3) and increase the temperature of the dehumidified air fed therefrom, as shown in FIG. 9, a heater/cooler (5) utilizing a Peltier element may be disposed on the downstream side of the adsorbent module (3). The heater/cooler (5) comprises a Peltier element (55) having a pair of plate surfaces which function as a heat-absorbing portion and a radiating portion, respectively, and a first heat-exchanging component (56) and a second heat-exchanging component (57) each comprising an air-permeable element which are disposed on the respective plate surfaces of the Peltier element (55). The element of each of the first heat-exchanging component (56) and the second heat-exchanging component (57) may have a corrugated type structure, a honeycomb type structure or a grid type structure similarly to that used in the adsorbent module (3).

The heater/cooler (5) may be positioned and disposed on the downstream side of the air passage switching device (4) as shown in FIG. 9(a) or between the adsorbent module (3) and the air passage switching device (4) as shown in FIG. 9(b). The air passage switching device (4) used above may have various structures, for example, there may be used the same device as shown in FIG. 1. When the heater/cooler (5) is disposed on the downstream side of the air passage switching device (4) as shown in FIG. 9(a), the air passage switching device (4) is disposed in the direction reverse to that in the apparatus shown in FIG. 1 to face the front side back so that the air flows fed from the adsorbent module (3) are separated into left and right flow paths owing to a passage structure thereof (not shown), whereby the humidified air and the dehumidified air can be introduced into the heater/cooler (5) disposed on the down streamside of the air passage switching device (4). Meanwhile, in the case where the apparatus is arranged as shown in FIG. 9(a), it is possible to lessen heat loss thereof owing to a less temperature change in the heater/cooler (5).

In the dehumidification and humidification apparatus of the present invention as shown in FIG. 9, an electric current flowing through the Peltier element (55) in the heater/cooler (5) is changed over synchronously with the switching operation of the adsorbent module (3) to switch operations of the first heat-exchanging component (56) and the second heat-exchanging component (57) between heating and cooling, so that it is possible to surely decrease the temperature of the humidified air fed from the adsorbent module (3) and surely increase the temperature of the dehumidified air fed therefrom. In addition, the electric current flowing through the Peltier element (55) may be controlled, if required, to control the temperatures of the humidified air and the dehumidified air.

Meanwhile, in the dehumidification and humidification apparatus of the present invention, when the setting of operation of the damper (44) of the air passage switching device (4) is switched, it is also possible to blow off the dehumidified air from the second blowoff port (12) toward passenger side, for example, in the summer season. In addition, in order to capture odorous components being present in the compartment of vehicles, a deodorant filter may be disposed on the upstream or downstream side of the adsorbent module (3).

The invention claimed is:

1. A dehumidification and humidification apparatus for vehicles for dehumidifying and humidifying air in a compartment of the vehicles, comprising a casing defining an air passage, and a blower, an adsorbent module and an air passage switching device which are successively accommodated in the casing in this order along a flow direction of the air,
wherein the casing comprises a first blowoff port through which the dehumidified or humidified air is blown off and a second blowoff port through which the humidified or dehumidified air is blown off; the adsorbent module comprises a Peltier element having a pair of plate surfaces which function as a heat-absorbing portion and a radiating portion, respectively, and a first adsorption component and a second adsorption component which each comprise an air-permeable element and an adsorbent supported thereon and are directly disposed on the respective plate surfaces of the Peltier element, the adsorbent module being disposed in the casing such that the air fed from the blower is allowed to pass through the respective adsorption components; and the air passage switching device is capable of turning each of the air passing through the first adsorption component of the adsorbent module and the air passing through the second adsorption component of the adsorbent module toward either the first blowoff port or the second blowoff port of the casing such that turning directions of the respective airs are switchable,
wherein an electric current flowing through the Peltier element in the adsorbent module is reversed to conduct switching between the heat-absorbing portion and the radiating portion of the Peltier element, and the air passage switching device is operated to switch the turning directions of the respective airs passing through the first and second adsorption components according to reversal of the electric current,
wherein the first adsorption component and the second adsorption component of the adsorbent module are respectively replaceable,
wherein the air passage switching device comprises a first introduction chamber into which the air passing through the first adsorption component of the adsorbent module is introduced; a second introduction chamber into which the air passing through the second adsorption component of the adsorbent module is introduced; a distribution chamber comprising a first inlet port and a second inlet port which are communicated with the first introduction chamber and the second introduction chamber, respectively, and a first outlet port and a second outlet port which are communicated with the first blowoff port and the second blowoff port, respectively, of the casing;
wherein the air passage switching device includes an actuator and a damper rotatably operated by the actuator which is disposed in the distribution chamber to divide an inside of the distribution chamber into two spaces, such that when the damper is rotated in one direction, the distribution chamber is divided into a space including the first inlet port and the first outlet port and a space including the second inlet port and the second outlet port, whereas when the damper is rotated in the other direction, the distribution chamber is divided into a space including the first inlet port and the second outlet port and a space including the second inlet port and the first outlet port;
a distribution chamber disposed between the first introduction chamber and the second introduction chamber;
wherein ribs are fitted inside of the casing in order to divide an interior of the casing into plural spaces along a flowing direction of the air,
a first rib is provided with an introduction port so as to flow the air into through the first inlet port and the second inlet port,
a second rib is provided with an the first outlet port and the second outlet port, and
an axis of the damper in the air passage switching device is perpendicular to a plate surface of each of the ribs; and
wherein the apparatus further comprises a heat exchanger disposed on a downstream side of the adsorbent module for performing sensible heat exchange between the air dehumidified or humidified by the first adsorption component of the adsorbent module and the air humidified or dehumidified by the second adsorption component of the adsorbent module.

2. A dehumidification and humidification apparatus according to claim 1, wherein the air passage switching device comprises an actuator and a damper operated by the actuator, and the turning directions of the respective airs are switched by means of the damper.

3. A dehumidification and humidification apparatus according to claim 1, wherein the element of each of the first adsorption component and the second adsorption component is in the form of a corrugated type element formed by laminating a plurality of honeycomb sheets each comprising a generally corrugated base sheet and a generally flat base sheet, and the corrugated type element has such a structure that the generally flat base sheet of each of the honeycomb sheets is disposed in parallel with the plate surfaces of the Peltier element.

4. A dehumidification and humidification apparatus according to claim 1, wherein the element of each of the first adsorption component and the second adsorption component is in the form of a corrugated type element formed by laminating a plurality of honeycomb sheets each comprising a generally corrugated base sheet and a generally flat base sheet, and the corrugated type element has such a structure that the generally flat base sheet of each of the honeycomb sheets is disposed perpendicularly to the plate surfaces of the Peltier element.

5. A dehumidification and humidification apparatus according to claim 1, wherein the adsorbent is a crystalline aluminophosphate having a framework structure comprising at least Al and P.

* * * * *